United States Patent
Ng et al.

(10) Patent No.: US 6,182,250 B1
(45) Date of Patent: Jan. 30, 2001

(54) IMPLEMENTATION OF VARIABLE BIT DENSITY RECORDING IN STORAGE DISC DRIVES

(75) Inventors: Wei Loon Ng; Teck Khoon Lim; Beng Wee Quak; Wing Hung Chan; Myint Ngwe, all of Singapore (SG)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/167,808

(22) Filed: Oct. 7, 1998

Related U.S. Application Data

(60) Provisional application No. 60/061,272, filed on Oct. 7, 1997.

(51) Int. Cl.[7] .................................................. G06F 11/00
(52) U.S. Cl. ............................................................ 714/704
(58) Field of Search ............................... 714/704; 711/712

(56) References Cited

U.S. PATENT DOCUMENTS

| | | | |
|---|---|---|---|
| 5,972,438 | * 10/1999 | Suzuki et al. | 427/548 |
| 5,999,352 | * 12/1999 | Teck et al. | 360/48 |
| 6,078,452 | * 6/2000 | Kittilson et al. | 360/51 |

* cited by examiner

*Primary Examiner*—Phung M. Chung
(74) *Attorney, Agent, or Firm*—Flehr Hohbach Test Albritton & Herbert

(57) ABSTRACT

The present invention pertains to an apparatus and method for recording data in a data storage medium. The data storage medium includes a number of discs, each having at least one recording surface. Each recording surface is associated with a read/write head that records and accesses data from the surface. Each recording surface is partitioned into a number of zones. Each zone is vertically aligned with a same zone on each surface of each disc. The zone boundaries on all surfaces of the disc drive are the same. The recording frequency for each zone on all surfaces can differ for each read/write head in order to compensate for a read/write head that cannot meet the BPI error rate threshold.

6 Claims, 6 Drawing Sheets

IMPLEMENTATION OF VARIABLE BIT DENSITY RECORDING IN STORAGE DISC DRIVES

CROSS-REFERENCE TO A RELATED APPLICATION

This invention is intended to further optimize variable bit density recording as previously disclosed in U.S. application Ser. No. 08/857,519, filed May 16, 1997, entitled Variable Bit per Inch Recording, assigned to the assignee of this application and incorporated herein by reference. This application is based on provisional application Ser. No. 60/061,272, filed Oct. 7, 1997, and incorporated herein by reference.

BRIEF DESCRIPTION OF THE INVENTION

The present invention relates generally to the storage of information on data storage mediums. More particularly, the invention relates to variable bit density recording in data storage mediums.

BACKGROUND OF THE INVENTION

Disc drives have utilized circular tracks for recording information on discs having a magnetic coating on the surface. It is a goal of a disc drive designer to provide as much storage capacity as possible. For a given physical structure, this can be accomplished by increasing the amount of data recorded on a track.

The surfaces of each disc have been divided into recording zones and the frequency of recording within a zone is maintained constant in order to maintain a relatively constant bit density across the recording surface. The recording frequency in each zone differs. The recording bit density in each zone is a function of the ratio of the recording frequency over the linear velocity of the rotating disc drive. Thus, the recording bit density in each zone is the same across each disc.

FIG. 1 illustrates the recording zones in a typical hard drive. There is shown a pair of discs 100 and 102 in a disc drive, each disc having recording zones defined as Z1, Z2, and Z3. The zones in the two-disc drive are vertically aligned and the boundaries of the zones are defined radially by the distances indicated by R1–R4 based on the distance from the center C of the disc. The recording frequency used in each zone of each disc is the same. Thus, the recording frequency used in zone Z1 of disc 1 is the same as that used in zone Z1 of disc 2. Furthermore, the recording bit density associated with zone Z1 of disc 1 is the same as that used in zone Z1 of disc 2. The zones are numbered such that the recording frequency decreases as the linear velocity decreases as the zone number increases.

The recording frequency used within each of the zones is determined at the design stage based on various factors, including an expected nominal head read/write performance for the heads to be used in the drive. The performance of each head with its respective surface is measured to determine if it met the minimum performance standard threshold. If any of the heads in a disc array failed to reach at least the minimum threshold, the drive was considered unacceptable and was shipped unless the head could be replaced to meet the minimum performance standard.

The replacement of a failed head can become an expensive task. In some cases, a failed head can miss the minimum performance standard threshold by a slight margin. In these cases, the replacement of the failed head is needless and it is more economically feasible to attempt to accommodate for the lost storage capacity.

Accordingly, there is a need for a mechanism by which the storage capacity associated with a disc drive can be maintained even with read/write heads that do not meet the desired recording bit density thresholds.

The incorporated application discloses the basic concept of recording at different frequencies on different disc surfaces. However, because of the constant demand for increased disc capacity, further optimization of this technique of Variable Bit per Inch (VBPI) Recording is very desirable.

SUMMARY OF THE INVENTION

The present invention pertains to an apparatus and method for recording data in a data storage medium. One such data storage medium is a disc drive having a number of discs, each of which have at least one recording surface. Each recording surface is associated with a read/write head that records and accesses data from the surface. Each recording surface is partitioned into a number of zones. Each zone is vertically aligned with a same zone on each surface of each disc. The zone boundaries on all surfaces of the disc drive are the same. The recording frequency for each zone on all surfaces can differ for each read/write head in order to compensate for a read/write head that cannot meet the BPI error rate threshold.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 2:
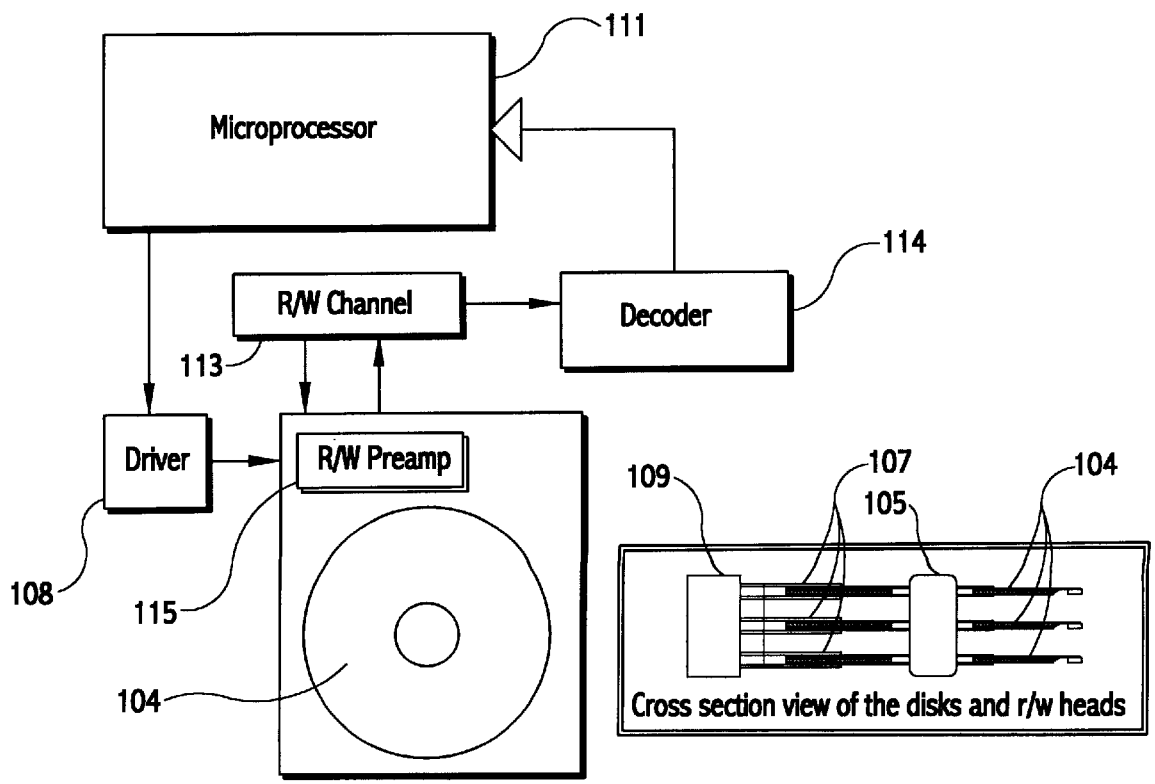
FIG. 2 illustrates an exemplary disc drive in accordance with a preferred embodiment of the present invention.

FIG. 2 illustrates the basic elements of a disc drive system in which the present invention would be useful. The system includes three disc platters 104A–104C and six recording heads, 106–116. Each disc platter 104 is associated with a pair of the recording heads. For example, disc platter 104A has a first recording head 106 that is used to read/write data on the top surface of the disc platter 104A and a second recording head 108 that is used to read/write data on the bottom surface of the disc platter 104A. Each pair of read/write heads is mounted on an actuator arm 107 to be positioned over selected tracks on the discs 104. A spindle motor 105 spins the discs at a constant speed to cause the heads to fly over the surface of the disc, while an actuator driver circuit 108 powers the drive coils 109 to move the actuator arms and the heads to a selected track.

A microprocessor 111 contains firmware to control the actuator arm position and read/write to the recording disc media. The "physdisc" table which is the subject of this invention is stored herein; this table is used to determine the surface recording density of each recording media on the disc drive. The disc drive further includes a read/write channel 113 which processes the analog signals to digital form; a decoder circuit 114 which decodes data read from the read/write channel to a form usable by the microprocessor; in a read/write preamplifier 115 where amplifying the signals read from the disc 104.

Figure 1:
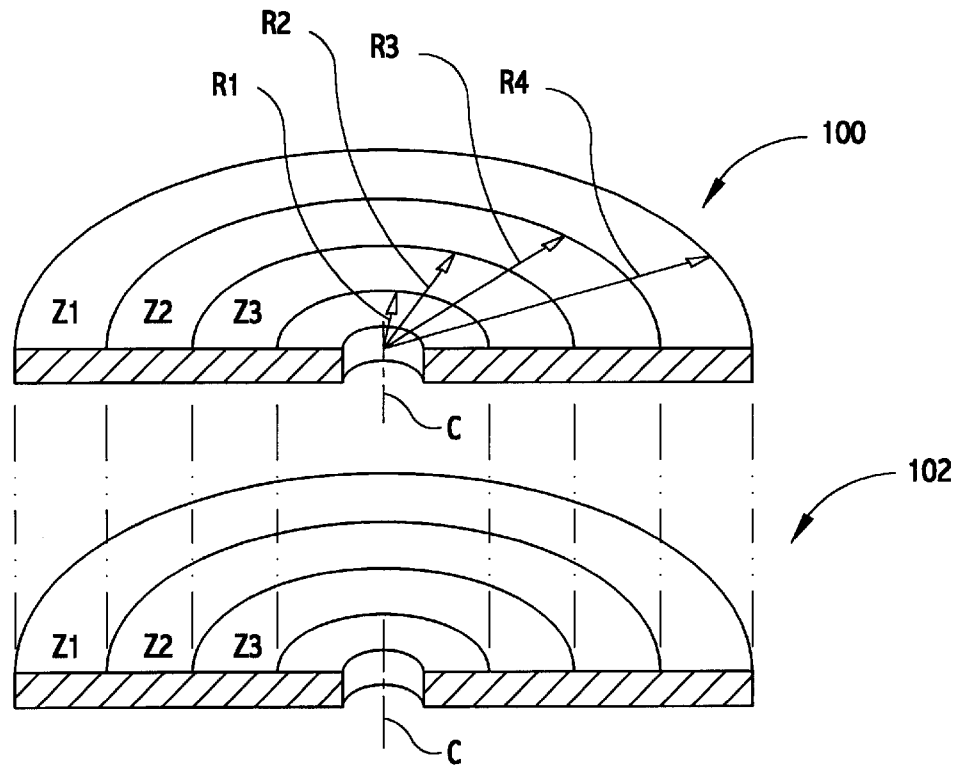
FIG. 1 illustrates a zone layout for a pair of magnetic recording discs.
Figure 3:
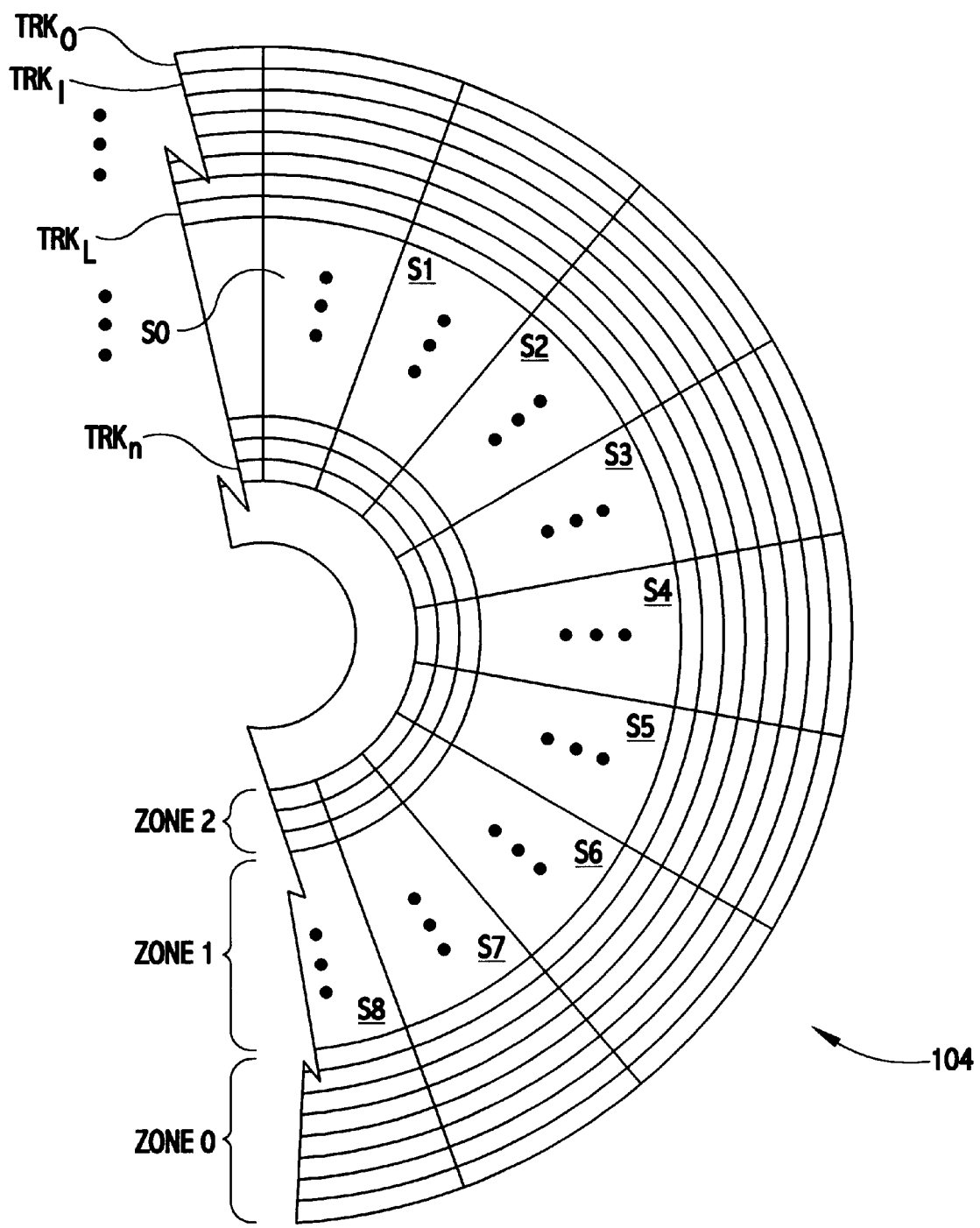
FIG. 3 illustrates an exemplary recording surface layout in accordance with a preferred embodiment of the present invention.

FIG. 3 illustrates an exemplary surface of a disc platter 104. The planar surfaces of each disc platter is coated with a suitable magnetic material to provide for the recording of digital signals on the media. Each surface is partitioned into a number of zones. As shown in FIG. 3, there are three such zones labeled as Zone 0, Zone 1, and Zone 2. Each zone is associated with a recording frequency that maintains a relatively constant bit density across the recording surface. The recording frequency in each zone differs. The bit density in each zone is a function of the ratio of the recording frequency over the linear velocity of the rotating disc drive. Furthermore, as shown in FIG. 1, each zone boundary is vertically aligned in each surface of the drive and each zone boundary remains uniform for the same zone on all surfaces.

Data is recorded in sectors along concentric tracks. In FIG. 3, there is shown eight sectors labeled S0–S8 and a number of concentric tracks labeled $TRK_0$–$TRK_n$. The sectors are distributed on the surface such that they are identified by a track, head, and sector number. Every sector has a unique address, known as a physical block address (PBA), which identifies the physical location of the data stored on the disc at a particular sector, head, and track.

Figure 4:
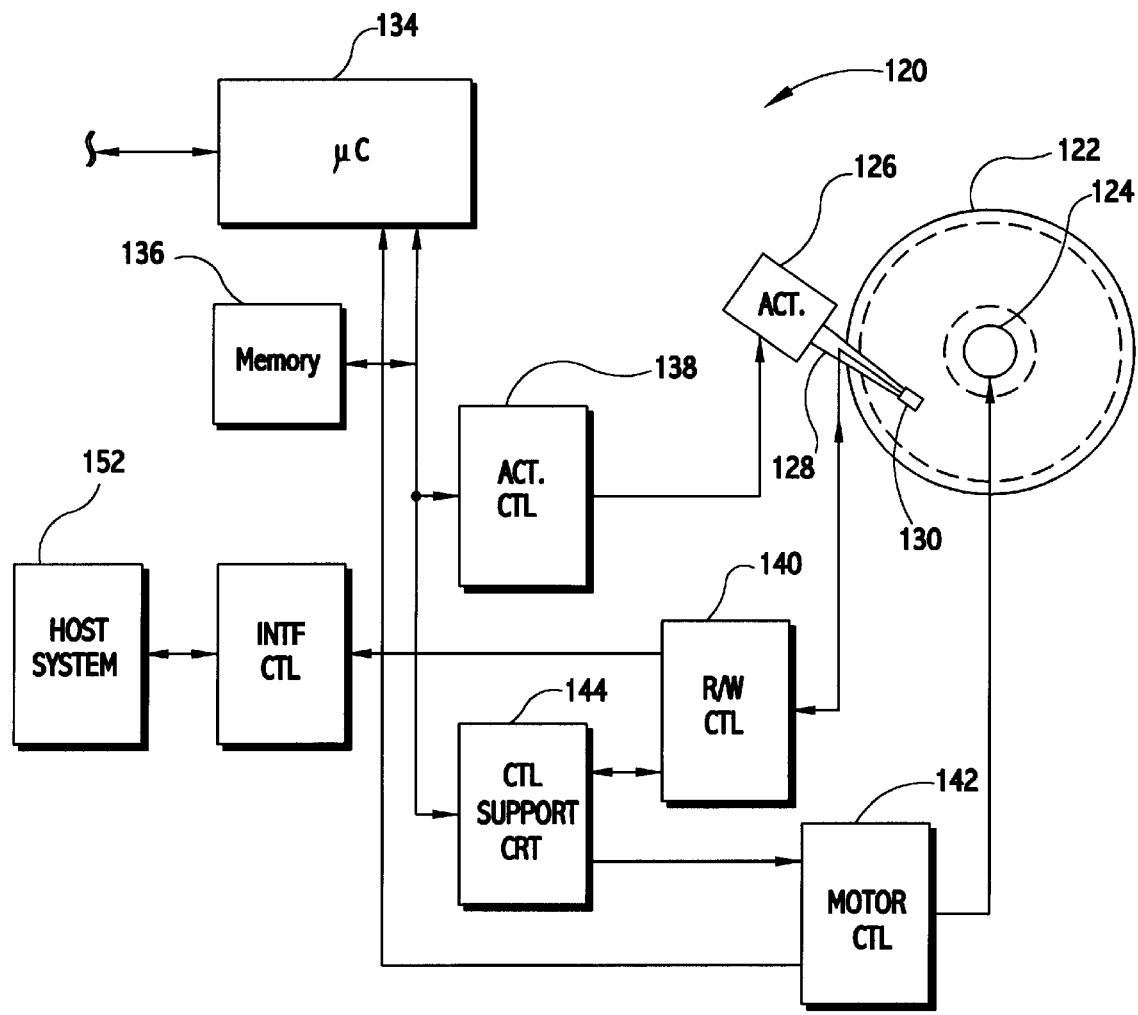
FIG. 4 illustrates a disc drive controller in accordance with a preferred embodiment of the present invention.

FIG. 4 illustrates a disc drive system controller 120 utilizing the technology of the present invention. There is shown a magnetic disc platter 122, driven by a spin motor 124, an actuator 126 for the proper positioning of an arm 128, and one or more heads 130 that read or write data from a sector on the magnetic surface of the disc. It should be noted that for illustration purposes only there is only one head 130 and disc platter 122 shown in FIG. 4. Typically, there are multiple heads and disc platters associated with a disc drive as is shown in FIG. 2.

The operation of the spin motor 124 and actuator assembly 126, 128, 130 are well known in the art. The disc drive system controller 120 performs all the essential support processes necessary to permit an external host system 132, typically a data processing system such as but limited to a personal computer or the like, to store and retrieve data from the disc 122. There is a microcontroller 134 and a memory 136 that is used to store program and data for the microcontroller 134. The microcontroller 134 controls the operations of the various components of the disc drive system 120 in order to access data from the disc 122. The physdisc table (discussed in detail below) is preferably stored in memory 136; the table entries determine the surface recording bit density of each media surface on the disc drive.

The actuator controller 138, under the control of the microcontroller 134, drives the electromagnetic positioning voice coil of the current drive level provided to the actuator 126. The read/write controller 140, under the control of the microcontroller 134, supports read and write operations to the disc 122. Additional hardware support for the actuator controller 138, motor controller 142, and read/write controller 140 is provided by the control support circuitry 144. The functions of the control support circuitry 144 are generally to process sector servo bursts and to provide control signals to the actuator 138, spin motor 142 and read/write 140 controllers.

Figure 5:
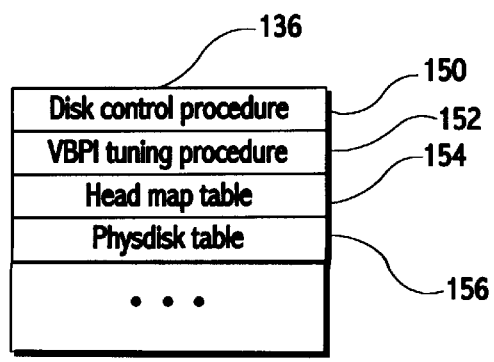
FIG. 5 illustrates the memory shown in FIG. 4 in accordance with a preferred embodiment of the present invention.

FIG. 5 illustrates the memory 136 of the disc drive controller 120. There is shown the following:

a disc control procedure 150 that controls the disc recording and retrieval operations;

a variable bit per inch (VBPI) tuning procedure 152 that is used to determine the recording bit density or bit per inch (BPI) of a read/write head;

a head map table 154 that is used to map logical heads to a corresponding physical head;

a physdisc table 156 that contains the recording frequency used for each read/write head in each zone in each recording surface. It should be noted that there is typically a physdisc table entry for each disc; the physdisc table can reside in a predetermined location on a disc or in a region of memory 136;

as well as other data and procedures.

The disc drive controller 120 is used to perform the data recording and retrieval operations associated with the disc drive. In addition, the disc drive controller is used to perform the VBPI tuning process which is discussed in detail below.

In the preferred embodiment of the present invention, the recording bit density associated with a read/write head can differ for each zone on each recording surface in the disc drive. In the prior art, the recording bit density is the same for each zone on each surface of the disc drive. However, in many cases, a head/media combination may not be capable of achieving the target threshold recording bit density. In this case, the head/media combination is associated with a different recording bit density as assigned by the physdisc table. In order to maintain the same storage capacity, while the recording bit density for the head/media combination not satisfying the threshold is decreased, the recording bit density is increased in the same zone in one or more of the other head/media combinations, all under control of the physdisc table.

An example of how this is achieved will now be given with respect to a typical disc drive which utilizes three platters, each having a recording surface on either side, and six heads, one head being associated with each recording surface. Obviously, the same principles will apply for any disc drive having two or more platters. The invention of variable bit per inch tuning is implemented as follows. The VBPI tuning is conducted when the drive is first manufactured. The disc drive goes through a series of self-tests, i.e., when power is first applied to the disc drive the firmware in the drive tests itself through completion. The invention is implemented by determining the quality of each read-write head/media combination (which may be referred to hereafter simply as "head") before actual data is written to or read from the disc media. The testing procedure which is utilized when manufacturing of the disc is completed is as follows.

The disc drive is put into a huge oven to control the temperature it is exposed to during testing and it is powered up. The disc drive spins up in servo calibration and servo related testing is performed. The BPI testing for error rate is performed next; this testing will be discussed further below. The error rate of each head in the drive is determined at this point.

Based on the quality of the heads, that is, on the ability of the head to record or read data with an acceptable error rate relative to the target error rate, a most appropriate physdisc, i.e., a control table which sets the recording rate for each head media combination in the disc drive, is chosen from a set of available physdiscs to be used for this particular disc drive. Using the chosen physdisc which also describes the zones and sectors layout of the drive, the entire drive is now written with usable addressable sectors. This is also called "formatting" the disc drive. Next, these formatted sectors are read back to determine which are the bad ones. The unusable sectors will be marked bad and not used in the future. The VBPI tuning is now complete.

To complete testing, the temperature of the oven can be varied and the disc drive put into rigorous read/write tests to test its reliability. If the drive passes all test requirements, it can be shipped out as a good disc drive. The use of a selected physdisc from a set of available physdiscs for each disc drive allows the performance of each head (i.e., head/media combination) to be optimized. By optimized, it is meant that any head which falls below the target recording rate is set to record data a slightly lower rate so that it does not fail. To make up for the lower data recording rate from this single head, one or more of the other heads are pushed at a slightly higher recording rate than the optimum or target rate. However, this adjusted rate at which the heads are pushed is not set so high as to cause these head which are now recording at a higher rate to also fail. Thus, the target recording rate for the entire system is optimized.

Figure 6A:
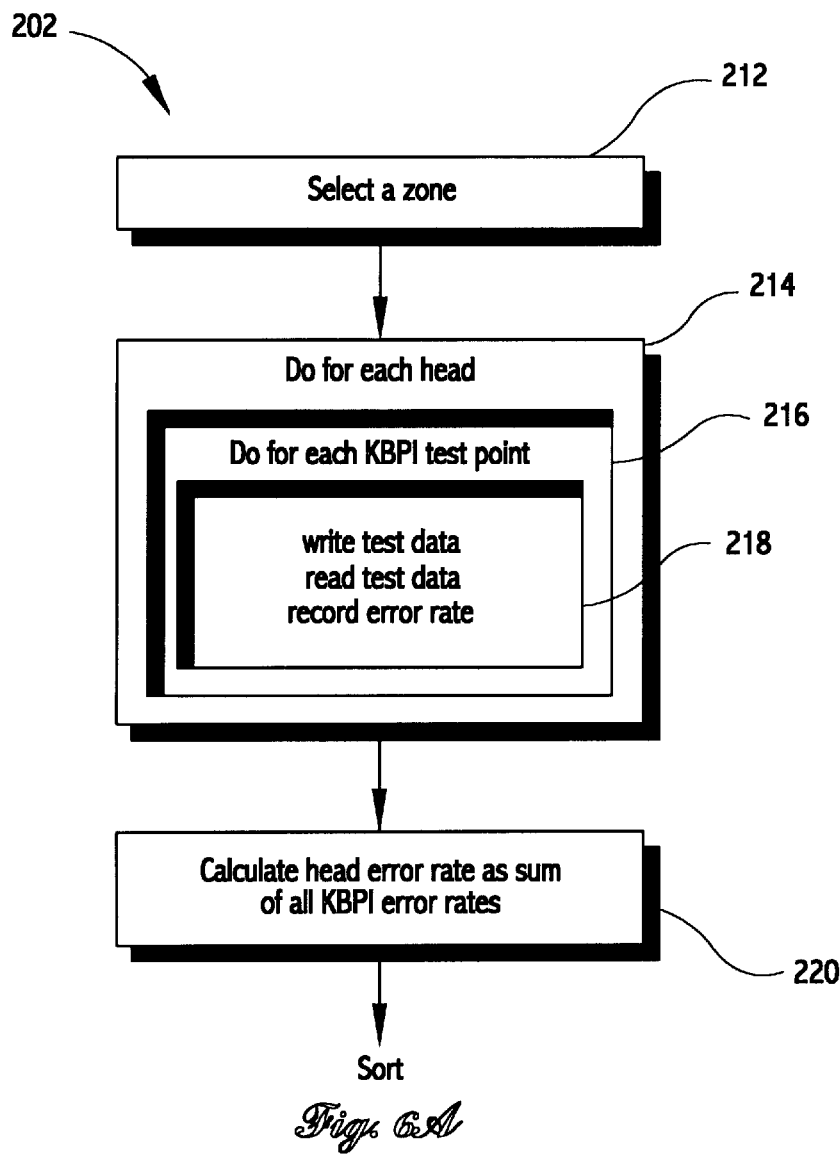
FIG. 6A is a flow chart illustrating the steps used to determine the BPI error rate for each head in a preferred embodiment of the present invention.

Referring next to the actual testing which must be conducted to establish the head/error rate, and referring to FIG. 6A, the testing sequence 202 begins with selection of a user data zone on each disc for BPI error rate read/write testing. The same, corresponding zone on each disc is selected. Then taking each head, data is written with a plurality of different data rates in kilobits per inch (KBPI) onto each disc at the selected zone. After a plurality of KBPI tests have been conducted at step 216, the data is read back and an error rate recorded at step 218. After a number of data rates have been used with each head, a graph of the performance of all the heads in a given disc drive can be developed as shown in FIG. 6B.

As a next step, the total error rate for each head is sorted in ascending order. Therefore, considering the example in FIG. 6B, the heads would be rated in the following order in terms of their BPI error test rate performance. Head 0 and head 1 are the weakest heads, compared to the rest of the heads. Assuming the drive is operating at 120KBPI, and the error rate test limit is 750, then head 1 with an error rate of 970 would fail the test if no margin above or below the standard data rate for each head is utilized. This could be represented by a table which is labeled P43N0P0, where P43 identifies the disc drive, N0 represents the negative margin allowed for the head, and P represents the positive margin assigned for the head. According to this invention, a plurality of tables are available in a disc drive, which would assign some margin above or below the nominal KBPI recording rate for each head, so that the heads which were weak or would fail if operated at a normal rate can now be operated with a negative margin and therefore operate at a data rate at which they would not fail; and by the same token, other heads would be assigned by the physdisc table to operate at a positive margin, or be driven at a slightly higher data rate so that the total capacity of the disc drive would still be achieved. In this particular example, we wish to assign a suitable VBPI physdisc to the drive which would enable head 1 to reduce its operating KBPI value and pass the error rate test, while driving at least one other head at a slightly increased marginal error rate.

We have already established that in each disc drive, according to this invention, a plurality of physdisc tables can be stored. The nominal one of these physdisc tables, assigns no margin to any head so that the same recording density is used throughout the drive. We must now select an alternative physdisc table for the disc drive which is the subject of this test, so that the disc drive will operate successfully and store the target amount of data. In the example selected for this particular line of disc drives, two further physdisc table settings are available, P43N2P1 and P43N4P2. The physdisc P43N2P1 means the two weakest heads will use −2 KBPI less than the default setting, while the four better heads will use +1KBPI more on top of the default setting for recording across the whole drive (not just for recording in the single zone where the recording efficiency was being tested). It is apparent, of course, that these numbers −2 and +1 could represent actual reductions and increases in the KBPI setting, or percentage reductions and increases from the same KBPI rate. Alternatively, a physdisc table P43N4P2 means that the two weakest heads would be operated at −4KBPI, and the four strongest heads would be operated at +2KPBI. Of course, it can be seen that these settings, when summed together, result in the total data recording rate across the entire drive achieving the target designation for the drive so that the drive remains a good drive.

Figure 6B:
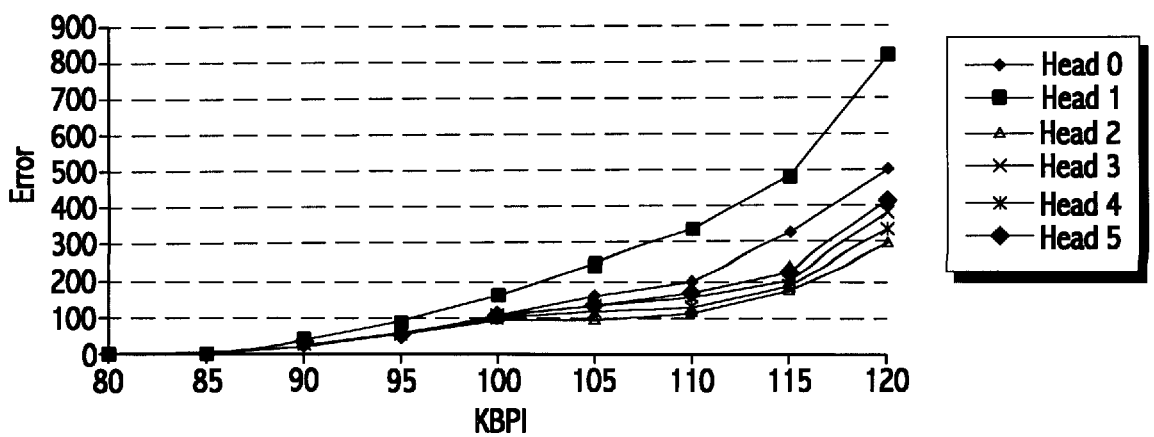
FIG. 6B is a graph illustrating exemplary KBPI error rates at each KBPI test point for each read/write head.
Figure 7A:
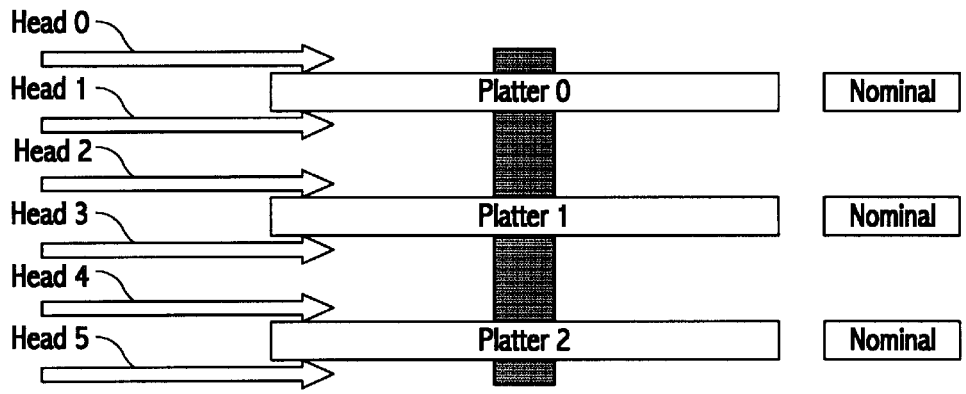
FIGS. 7A–7C illustrate exemplary physdisc configurations in accordance with a preferred embodiment of the present invention.

Considering the sorting done in our particular example above of FIG. 6B, we would classify the heads into two groups, good and bad, according to their quality measured by the total error rate. Under this particular VBPI physdisc table scheme, the bad group contains two heads (HD0 and HD1) while the good group has four heads (HD2, HD4, HD3, HD5). The results of using the first physdisc table, N0P0, are shown in FIG. 7A, where all heads are operated at nominal data recording rates. The results of using the physdisc table N2P1 results in the configuration of FIG. 7B; the results of using physdisc table N4P2 results in the recording at the rates shown in FIG. 7C.

Two further adjustments are available even after this first analysis is completed and the appropriate physdisc table is selected. The table having been selected, caution must be taken to prevent the case where the bad heads pass, having been given appropriate compensation, but now good heads fail from being over stressed by being assigned too high a data rate.

Hence a set of tolerance numbers are developed for checking against the limit of the KBPI rate that a normally good head can take. For the example of FIG. 8, which is an example where the above three physdisc tables are provided, the default rate where no adjustments are made to the recording rate is assigned to the region from 0 to α%; the intermediate case is assigned the range from α% to β%, and the region from β% to 100% is assigned to the case where the greatest change in margins occurs. The percentage is based on a fraction which is determined by the total error rate for the worst head from the bad head group, minus the total error rate from the worst head in the good head group, divided by the total number of sectors tested. Then the default case 800 is assigned where the percentage difference is between 0 and α%; the intermediate case 802 is assigned where the difference in percentage is between α% and β%; and the segment for maximum adjustment in the recording rates is assigned for the condition where the difference in error rates is between β% and 100%. In the example we have been processing, which was based on the head test of FIG. 6, head 1 and head 5 are the two worst cases from their respective groups, i.e., the bad head group and the good head group. Comparing that figure with the result of FIG. 10, which is the way the heads are operating after reassignment according to the N4P2 physdisc, it can be seen from FIG. 9 that the error rate for the weakest head of the bad group has been reduced to an acceptable level, while the error rate of all heads in the good head group has been kept at an acceptable level. Therefore, the drive is now a viable drive.

Figure 7B:
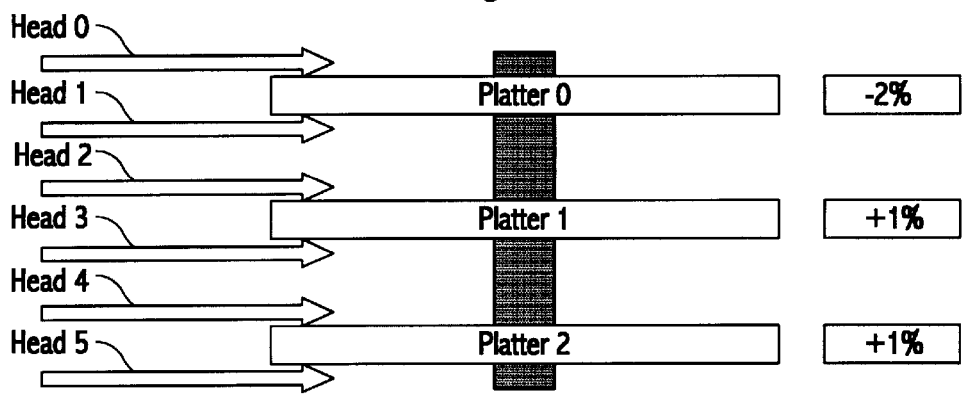
Figure 7C:
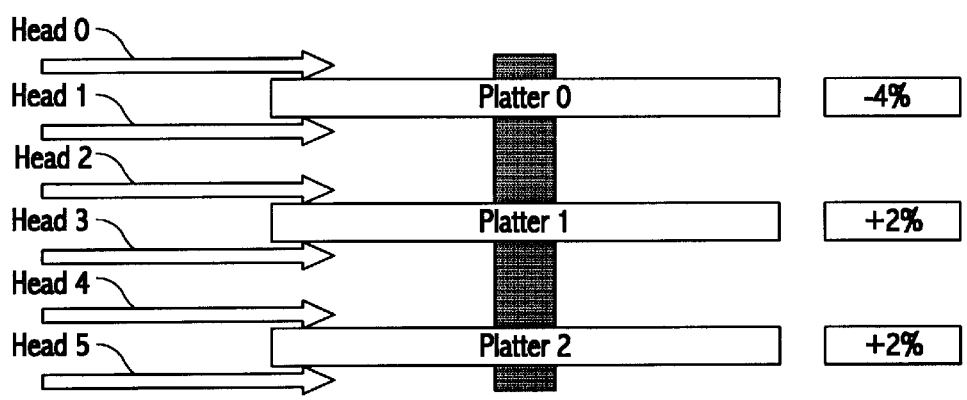

In an actual hard disc drive, the recording bit densities may not be distributed as shown in FIGS. 7A–7C. A head map table 154 is used to map each logical head to one appropriate physical head. Each logical head is associated with a prescribed storage capacity which is based on the recording frequency and hence recording bit density of the corresponding physical head. In the nominal case, the mapping of a logical head to a physical head does not consider the recording frequency or recording bit density of a particular physical head. This is because there is a uniform recording frequency associated with each head and for each zone in each disc surface. However, it is also possible that each physical head can be associated with a different recording frequency and hence recording bit density. As such, the head map table is used to map each logical head to a corresponding physical head that is capable of accommodating the storage capacity associated with the respective logical head.

Figure 9A:
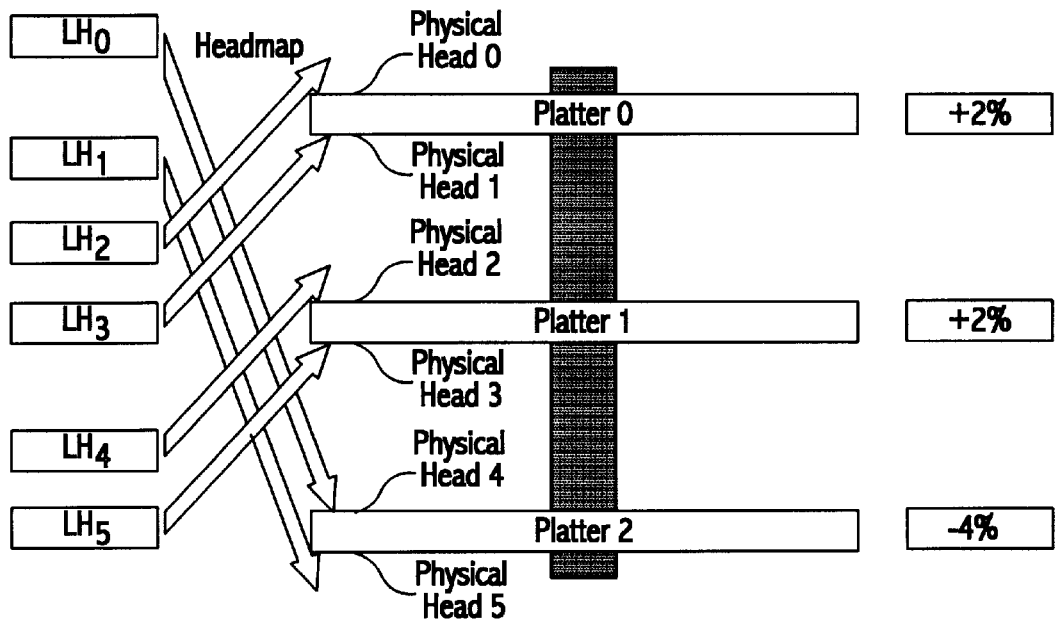
FIGS. 9A–9B illustrate exemplary logical head to physical head mappings in accordance with a preferred embodiment of the present invention.
Figure 9B:
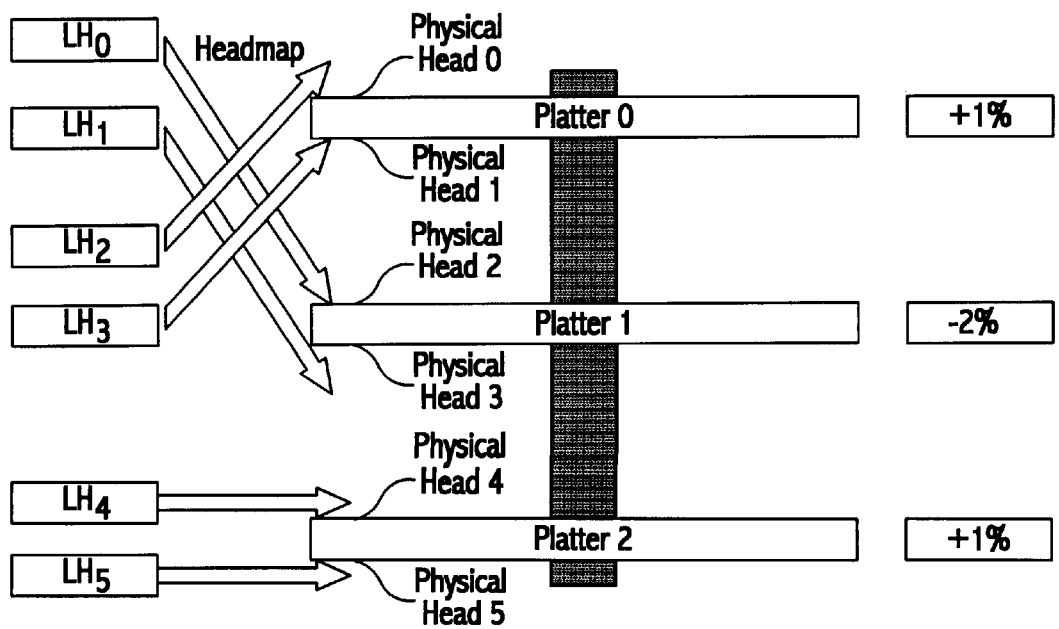

FIGS. 9A–9B illustrates the mapping of the logical heads to corresponding physical read/write heads. Referring to FIG. 9A, there is shown six physical read/write heads, labeled Physical Head 0–Physical Head 5, and six logical heads, labeled $LH_0$–$LH_5$. Each logical head has a prescribed storage capacity and is mapped to a respective physical head that can accommodate the storage capacity. For example, logical head $LH_0$ is mapped to physical head 4 whose recording bit density has been reduced by 4% of a nominal recording bit density, logical head $LH_1$ is mapped to physical head 5 whose recording bit density has been reduced by 4% of a nominal recording bit density, logical head $LH_2$ is mapped to physical head 0 whose recording bit density has been increased by 2% of a nominal recording bit density, logical head $LH_3$ is mapped to physical head 1 whose recording bit density has been increased by 2% of a nominal recording bit density, logical head $LH_4$ is mapped to physical head 2 whose recording bit density has been increased by 2% of a nominal recording bit density, and logical head $LH_5$ is mapped to physical head 3 whose recording bit density has been increased by 2% of a nominal recording bit density. It should be noted that there can be multiple logical heads mapped to a particular physical head.

FIG. 9B shows six physical heads, labeled Physical Head 0–Physical Head 5, and six logical heads, labeled $LH_0$–$LH_5$. Each logical head has a prescribed storage capacity and is mapped to a respective physical head that can accommodate the storage capacity. For example, logical head $LH_0$ is mapped to physical head 2 whose recording bit density has been reduced by 2% of a nominal recording bit density, logical head $LH_1$ is mapped to physical head 3 whose recording bit density has been reduced by 2% of a nominal recording bit density, logical head $LH_2$ is mapped to physical head 0 whose recording bit density has been increased by 1% of a nominal recording bit density, logical head $LH_3$ is mapped to physical head 1 whose recording bit density has been increased by 1% of a nominal recording bit density, logical head $LH_4$ is mapped to physical head 4 whose recording bit density has been increased by 1% of a nominal recording bit density, and logical head $LH_5$ is mapped to physical head 5 whose recording bit density has been increased by 1% of a nominal recording bit density.

The steps used to assemble a disc drive utilizing the technology of the present invention will now be considered in further detail. In constructing a disc drive, the head/disc assembly is constructed. The head/disc assembly is shown in FIG. 4 as including the actuator 126, the arm 128, the head 130, the disc 122, and the spin motor 124. The servo information is written in the tracks on the discs using a servo track writer of the type well known to those skilled in the art. In addition, the zone boundaries are generated for each head-disc combination based on an expected head, disc, and channel capability and remain static on each recording surface in the disc drive.

Next, the head/disc assembly is tested. The VBPI tuning procedure 152 performs the test. In particular, the head performance of the assembly is tested which is defined in the art on the basis of head performance at a given recording frequency, $f_R$, in terms of the bit per inch (BPI) error rate. The BPI error rate is defined as the number of bits transferred per bit in error when data is read at a predetermined location. The drive designer defines a minimum BPI error rate threshold that each head needs to adhere to. If a particular head does not met the BPI error rate threshold, then the head is deemed to have failed the test. A failed head is then subject to variable bit per inch (VBPI) tuning in order determine if the drive can be configured to compensate for the lost storage capacity.

The VBPI tuning procedure determines the BPI error rate for each head (step 202). FIG. 6A illustrates the steps used to measure the BPI error rate for each head. These steps are performed by the VBPI tuning procedure 152. First, a particular zone is selected for the test (step 212). Next, each recording head is tested (step 214) using a number of different data rates otherwise referred to as Kilo Bits Per Inch (KBPI) test points (step 216). For each KBPI test point, test data is written onto the disc surface at the selected zone and read back from the written location (step 218). The test data is then checked for the presence of any errors and the KBPI error rate for the corresponding KBPI test point is updated accordingly. The KBPI error rate for a particular test point i is calculated in accordance with the following mathematical relation:

$$Error_{KBPI(i)} = \text{number of erroneous sectors/total number of sectors}.$$

FIG. 6B is a graph illustrating the KBPI error rates at the various test points for the various read/write heads for a particular zone. The KBPI test points are on the x-axis and the error rates are on the y-axis. There are six curves, one for each read/write head.

Once the KBPI error rate has been determined for each test point i=1, . . . , n, the total error rate for the head, $Error_{HD}$, is calculated as the sum of all the KBPI error rates for each test point (step 220). This can be represented by the following mathematical relation:

$$\text{Error}_{HD} = \sum_{i=1}^{n} \text{Error}_{KBPI(i)}$$

The VBPI tuning procedure 152 then sorts the BPI error rates for each head, Error $_{HD}$, in ascending order (step 204). For example, for the disc drive shown in FIG. 1 that has six heads, the sorted order can be as follows:

Error$_{HD2}$<Error $_{HD4}$<Error $_{HD3}$<Error$_{HD5}$ <Error $_{HD0}$<Error $_{HD1}$ In this example, the second head, HD2, has the lowest error rate and the first head, HD1, has the highest error rate. Heads 1 and 0, (HD$_1$,HD$_0$), are the weakest heads when compared with the other heads since they have the highest error rate.

The task then becomes one of tuning the disc drive by assigning a predetermined VBPI physdisc to the drive so that the disc drive can pass the BPI error rate threshold (step 206). Once the appropriate VBPI physdisc configuration is determined, which will be explained below, the physdisc table is updated to reflect the recording frequency associated with each head in a particular zone. The information in the physdisc is then used in accessing the information stored on each disc surface.

The VBPI tuning procedure 152 then groups each of the read/write heads into two groups. A first group is considered the good group and the second group is considered the bad group. The first group includes the four read/write heads having the lowest BPI error rates and the second group includes the two read/write heads having the highest BPI error rates. In the above example, the first group includes Heads 2–5, and the second group includes Heads 0–1.

The assignment of the appropriate VBPI physdisc configuration is made based on the percentage difference between the error rate of the worst head in the second or bad group (i.e., head with highest error rate) and the error rate of the worst head in the first or good group. The percent difference is used to determine the appropriate VBPI physdisc. The percent difference is represented by the following mathematical relation:

$$\% \text{ Difference} = [(\text{Error}_{HD\ worst\ in\ group}-\text{Error}_{HD\ worst\ in\ group\ 2})/\#of\ sectors\ tested] \times 100\%.$$

Figure 8:
FIG. 8 illustrates the thresholds used to define the ranges for each of the VBPI physdiscs in accordance with a preferred embodiment of the present invention.

Referring to FIG. 8, there is shown the three ranges: (1) the first range is between 0%–α% and defines the range for the nominal VBPI physdisc configuration, see FIG. 7A; (2) the second range is between α%–β% and defines the range for the second VBPI physdisc configuration, see FIG. 7B; and (3) the third range is between β%–100% and defines the range for the third VBPI physdisc configuration, see FIG. 7C.

The VBPI tuning procedure 152 matches the percentage difference to the corresponding range to determine the appropriate VBPI physdisc for the disc drive. Thus, the first VBPI physdisc is selected if the percentage difference is less than α%, the second VBPI physdisc is selected if the percentage difference is between α%–β%, and the third VBPI physdisc is selected if the percentage difference is greater than β%.

The VBPI tuning procedure 152 then configures the recording bit density for each of the read/write heads in accordance with the selected VBPI physdisc configuration. Each of the read/write heads in the good group are increased by the increased BPI percentage in the VBPI physdisc and each of the read/write heads in the bad group are decremented by the decreased BPI percentage in the VBPI physdisc. The VBPI tuning procedure 152 sets the recording frequency for each read/write head for the tested recording zone based on the modified BPI percentage (step 207).

It should be noted that steps 202–207 are used to determine the recording frequency for one particular recording zone. These steps are repeated for each additional recording zone.

Next, the logical heads are mapped into the appropriate physical heads (step 208). As noted above, there can be many logical heads for a particular physical head. The mapping of the logical heads to the physical heads is then stored in the head map table 154. The head/disc assembly is then retested (step 210). When the disc drive successful completes the test, the disc drive is used to record and retrieve data (step 211).

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. For example, any number x of zones could be used on the discs, although x should be the same on each disc surface. However, it would also be within the skill of the technology to utilize the principles taught herein in a system wherein different numbers of zones may be found on one or more discs. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

The present invention has been described with reference to a magnetic disc storage unit. However, the technology of the present invention is not constrained to this particular storage device and can be applied to other types of storage mediums such as but not limited to optical storage devices and the like.

What is claimed is:

1. A method for recording data on a data storage medium having a plurality of discs and a plurality of read/write heads, each disc having at least one recording surface, each read/write head associated with a particular recording surface, each recording surface having a plurality of zones, each zone is vertically aligned with a same zone on each surface of each disc, said method comprising the steps of:

selecting a first zone;

determining a Bits Per Inch (BPI) error rate for each read/write head for the first zone;

ascertaining a deviation factor from a nominal BPI recording density associated with the first zone for each read/write head based on the BPI error rate;

calculating a recording frequency corresponding to the deviation factor ascertained for each read/write head; and using each read/write head at a corresponding recording frequency to access data in the first zone on each respective recording surface.

2. The method of claim 1,
wherein the deviation factor is selected from the set consisting of an increased percentage of the nominal BPI recording density, a decreased percentage of the nominal BPI recording density, and the nominal BPI recording density.

3. The method of claim 1,
said determining step further comprising the steps of:
  obtaining a plurality of kilo bits per inch (KBPI) test points;
  calculating an error rate at each KBPI test point; and
  determining the BPI error rate for a read/write head as a sum of each error rate at each KBPI test point.

4. The method of claim 1,
said ascertaining step further comprising the steps of:
  providing a set of variable bits per inch (VBPI) physdiscs;
  selecting one of said VBPI physdiscs based on the BPI error rates; and
  assigning a deviation for each read/write head based on the selected VBPI physdisc.

5. The method of claim 1,
said ascertaining step further comprising the steps of:
  ranking each BPI error rate for each read/write head in accordance with an order;
  classifying each read/write head into a plurality of groups based on the ranked order;
  calculating a difference factor between the BPI error rates associated with select heads in each group;
  providing a plurality of BPI error rate ranges;
  finding a BPI error rate range matching the difference factor; and
  associating each read/write head in each group with a deviation factor corresponding to the matching BPI error rate range.

6. A computer readable memory to direct a data storage apparatus to function in a specified manner, data storage apparatus having a plurality of discs and a plurality of read/write heads, each disc having at least one recording surface, each read/write head associated with a particular recording surface, each recording surface having a plurality of zones, each zone is vertically aligned with a same zone on each surface of each disc, the memory comprising:
  a first executable module including instructions having the capability to
    select a first zone,
    determine a Bits Per Inch (BPI) error rate for each read/write head for the first zone,
    ascertain a deviation factor from a nominal BPI recording density associated with the first zone for each read/write head based on the BPI error rate,
    calculate a recording frequency corresponding to the deviation factor ascertained for each read/write head; and
    enable each read/write head to operate at a corresponding recording frequency to access data in the first zone on each respective recording surface.

* * * * *